United States Patent Office 3,516,960
Patented June 23, 1970

3,516,960
POLYVINYL ALCOHOL COMPOSITIONS WITH
IMPROVED OXYGEN BARRIER PROPERTIES
Joseph G. Martins, Ludlow, and Norman I. Mowry,
Springfield, Mass., assignors to Monsanto Company, St.
Louis, Mo., a corporation of Delaware
No Drawing. Filed Mar. 18, 1968, Ser. No. 714,047
Int. Cl. C08f 45/58, 45/62
U.S. Cl. 260—33.4                15 Claims

ABSTRACT OF THE DISCLOSURE

Disclosed herein are improved polyvinyl alcohol compositions with improved oxygen barrier properties which are suitable for packaging food, medicines and other related objects. The improved compositions comprise a matrix of polyvinyl alcohol resin having uniformly dispersed therein at least 0.03 part, per 100 parts of resin, of an oxygen barrier stabilizing compound which corresponds to the following general structure:

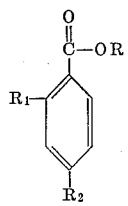

wherein R is selected from the group consisting of hydrogen, alkyl radicals of from 1 to 8 carbon atoms and alkali metals; and wherein $R_1$ and $R_2$ are selected from the group consisting of hydrogen, hydroxyl, alkyl radicals of from 1 to 5 carbon atoms and alkoxy radicals of from 1 to 5 carbon atoms provided that at least one of the $R_1$ or $R_2$ substituents is alkoxy or hydroxyl.

BACKGROUND OF THE INVENTION (1) Field of the invention

This invention relates to polyvinyl alcohol compositions suitable for packaging food, medicines and other related objects. More particularly, this invention relates to polyvinyl alcohol packaging materials which exhibit prolonged oxygen barrier properties when exposed to high humidity.

(2) Description of the prior art

Certain foodstuffs are extremely sensitive to oxygen and on exposure thereto undergo degradation such as undesirable oxidation, discoloration, loss of taste, and loss of aroma, whereas certain drugs and medicines will undergo a decrease in medical or therapeutic value. This oxidative degradation results in foods, medicines and drugs losing their consumer appeal and usefulness. This susceptibility of foodstuffs to oxygen is illustrated in "Modern Packaging," March 1965, "Flexible-Vacuum Performance," page 201 and following, wherein the extreme sensitivity of coffee to oxygen is discussed. The authors of this article state that only 14 cc. of oxygen will cause staling in one lb. of coffee.

Some dairy foods, meat products and medicines show as much, if not greater, oxygen sensitivity as coffee and in some instances require packaging materials with even lower permeability to oxygen than that required for coffee packaging. Thus, there is a great demand for packaging materials which will exhibit low permeability to oxygen. Polyvinyl alcohol has long been recognized as exhibiting very low permeability to oxygen. However, polyvinyl alcohol is generally considered deficient for packaging materials which are subject to prolonged exposures to conditions of high humidity. Under these conditions polyvinyl alcohol is found to undergo a decrease in its ability to afford a permeability barrier to oxygen.

Various attempts have been made to overcome this deficiency in polyvinyl alcohol by laminating or coating the surfaces of the polyvinyl alcohol film such as in U.S. Pat. 3,214,291 where the patentees are coating polyvinyl alcohol with a vinylidene chloride-acrylonitrile copolymer or as in U.S. Pat. 3,282,729 wherein the patentees are laminating polyvinyl alcohol to a polyolefin. However, these methods, per se, are not directed to improving the retention of the oxygen barrier properties of polyvinyl alcohol upon prolonged exposure to conditions of high humidity. Rather they are directed to keeping moisture and humid air away from polyvinyl alcohol film. When moisture permeates the onter coating or outer member of the laminate the polyvinyl alcohol film is exposed to this moisture and a decrease in the oxygen permeability of the polyvinyl alcohol occurs. The need still exists for polyvinyl alcohol packaging materials which can be used alone or in combination with a coating or in a laminate which polyvinyl alcohol will exhibit retention of oxygen barrier properties upon exposure to conditions of high humidity.

SUMMARY OF THE INVENTION

The present invention relates to improved polyvinyl alcohol compositions suitable for packaging food, medicines and other related objects which compositions exhibit retention of oxygen barrier properties after prolonged exposure to conditions of high humidities. The compositions are characterized by having an oxygen permeability of less than 1.00 cc./mil/100 sq. in./24 hrs./cm. Hg after 14 days exposure to conditions of 100% relative humidity at 23.5° C. The improved polyvinyl alcohol compositions comprise a matrix of polyvinyl alcohol resin having uniformly dispersed therein at least 0.03 part, per 100 parts of resin, of an oxygen barrier stabilizing compound which corresponds to the following general formula:

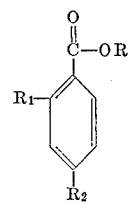

(I)

wherein R is selected from the group consisting of hydrogen, alkyl radicals of from 1 to 8 carbon atoms and alkali metals; and wherein $R_1$ and $R_2$ are selected from the group consisting of hydrogen, hydroxyl, alkyl radicals of from 1 to 5 carbon atoms and alkoxy radicals of from 1 to 5 carbon atoms provided that at least one of the $R_1$ or $R_2$ substituents is alkoxy or hydroxyl.

This invention solves a problem longstanding in the packaging art by providing polyvinyl alcohol compositions which exhibit retention of oxygen barrier properties after prolonged exposure to conditions of high humidities. These compositions are especially useful as packaging materials for food, medicines and other related objects which are susceptible to atmospheric oxygen degradation.

It is an object of this invention to provide polyvinyl alcohol packaging materials which exhibit retention of oxygen barrier properties after prolonged exposure to conditions of high humidities.

It is a further object to provide a process for preparing improved polyvinyl alcohol packaging materials.

It is a further object to provide food, medicines and other related objects packaged in the improved polyvinyl alcohol packaging materials.

The polyvinyl alcohol resin used to prepare the packaging film of the present invention is generally well known to those skilled in the art. This material is usually prepared by the acid or alkaline hydrolysis of a polyvinyl ester such as polyvinyl acetate, polyvinyl formate, polyvinyl propionate, polyvinyl butyrate, polyvinyl hexoate, polyvinyl benzoate and the like. The preferred polyvinyl ester used in the preparation of polyvinyl alcohol is polyvinyl acetate.

For use in the present invention, the hydrolysis of the polyvinyl ester should be substantially complete in that the residual ester groups, calculated as polyvinyl ester, e.g., polyvinyl acetate is less than 5% and preferably less than 3%. The especially preferred polyvinyl alcohol packaging material has a residual vinyl ester content, calculated as polyvinyl acetate, of less than 2% and a solution viscosity at 20° C. of from 4 to 76 cps. when measured as a 4% by weight aqueous solution.

As stated above the oxygen barrier stabilizing compound used in the present invention corresponds to the following general formula:

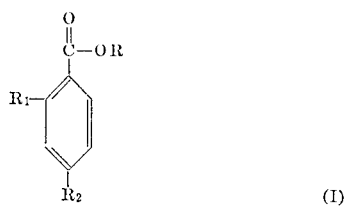

(I)

wherein R is selected from the group consisting of hydrogen, alkyl radicals of from 1 to 8 carbon atoms and alkali metals; and wherein $R_1$ and $R_2$ are selected from the group consisting of hydrogen, hydroxyl alkyl radicals of from 1 to 5 carbon atoms and alkoxy radicals of from 1 to 5 carbon atoms provided that at least one of the $R_1$ or $R_2$ substituents is alkoxy or hydroxyl.

In order to function effectively as an oxygen barrier stabilizing compound for polyvinyl alcohol resin the compound represented by the foregoing general structural formula must have at least one hydroxyl or alkoxy $R_1$ or $R_2$ substituent.

The minimum concentration of oxygen barrier stabilizer compound required in the polyvinyl alcohol resins of the present invention is at least 0.03 parts per hundred parts of resin. More preferably, one would use at least 1.0 parts of oxygen barrier stabilizer compound per hundred parts of resin. The upper limit on the concentration of oxygen barrier stabilizer compound is selected so as to impart maximum oxygen barrier stability to the resin without impairing other physical properties such as film clarity, thermal processability, etc. In general, the practical upper limit of the stabilizer compound concentration is about 5 parts per hundred parts of resin.

Stated in another manner, the concentration of oxygen barrier compound in the polyvinyl alcohol resin is from 0.03 to 5 parts per hundred parts of resin. More preferably, the concentration is from 0.1 to 3.0 parts per hundred parts of resin.

Examples of compounds which correspond to the foregoing Formula I which are suitable as the oxygen barrier stabilizing compound in the present invention include p-hydroxy-benzoic acid;
p-hydroxy-benzoic acid sodium salt;
p-hydroxy-benzoic acid potassium salt;
p-hydroxy-benzoic acid methyl ester;
p-hydroxy-benzoic acid ethyl ester;
p-hydroxy-benzoic acid propyl ester;
p-hydroxy-benzoic acid, butyl ester;
p-hydroxy-benzoic acid, octyl ester;
2,4-dihydroxy-benzoic acid;
2,4-dihydroxy-benzoic acid, sodium salt;
2,4-dihydroxy-benzoic acid, potassium salt;
2,4-dihydroxy-benzoic acid, methyl ester;
2,4-dihydroxy-benzoic acid, ethyl ester;
2,4-dihydroxy-benzoic acid, propyl ester;
2,4-dihydroxy-benzoic acid, butyl ester;
2-methoxy-4-hydroxy-benzoic acid;
2-methoxy-4-hydroxy-benzoic acid, sodium salt;
2-methoxy-4-hydroxy-benzoic acid, potassium salt;
2-methoxy-4-hydroxy-benzoic acid, methyl ester;
2-methoxy-4-hydroxy-benzoic acid, ethyl ester;
2-methoxy-4-hydroxy-benzoic acid, propyl ester;
2-methoxy-4-hydroxy-benzoic acid, butyl ester;
2-ethoxy-4-hydroxy-benzoic acid;
2-ethoxy-4-hydroxy-benzoic acid, sodium salt;
2-ethoxy-4-hydroxy-benzoic acid, potassium salt;
2-ethoxy-4-hydroxy-benzoic acid, methyl ester;
2-ethoxy-4-hydroxy-benzoic acid, ethyl ester;
2-ethoxy-4-hydroxy-benzoic acid, propyl ester;
2-ethoxy-4-hydroxy-benzoic acid, butyl ester;
2-propoxy-4-hydroxy-benzoic acid;
2-propoxy-4-hydroxy-benzoic acid, sodium salt;
2-propoxy-4-hydroxy-benzoic acid, potassium salt;
2-propoxy-4-hydroxy-benzoic acid, methyl ester;
2-propoxy-4-hydroxy-benzoic acid, ethyl ester;
2-propoxy-4-hydroxy-benzoic acid, propyl ester;
2-propoxy-4-hydroxy-benzoic acid, butyl ester;
2-butoxy-4-hydroxy-benzoic acid;
2-butoxy-4-hydroxy-benzoic acid, sodium salt;
2-butoxy-4-hydroxy-benzoic acid, potassium salt;
2-butoxy-4-hydroxy-benzoic acid, methyl ester;
2-butoxy-4-hydroxy-benzoic acid, ethyl ester;
2-butoxy-4-hydroxy-benzoic acid, propyl ester;
2-butoxy-4-hydroxy-benzoic acid, butyl ester;
salicylic acid;
salicylic acid, sodium salt;
salicylic acid, potassium salt;
salicylic acid, methyl ester;
salicylic acid, ethyl ester;
salicylic acid, butyl ester;
salicylic acid, propyl ester;
4-methoxy-salicylic acid;
4-methoxy-salicylic acid, sodium salt;
4-methoxy-salicylic acid, potassium salt;
4-methoxy-salicylic acid, methyl ester;
4-methoxy-salicylic acid, ethyl ester;
4-methoxy-salicylic acid, propyl ester;
4-methoxy-salicylic acid, butyl ester;
4-ethoxy-salicylic acid;
4-ethoxy-salicylic acid, sodium salt;
4-ethoxy-salicylic acid, potassium salt;
4-ethoxy-salicylic acid, methyl ester;
4-ethoxy-salicylic acid, ethyl ester;
4-ethoxy-salicylic acid, propyl ester;
4-ethoxy-salicylic acid, butyl ester;
4-propoxy-salicylic acid;

4-propoxy-salicylic acid, sodium salt;
4-propoxy-salicylic acid, potassium salt;
4-propoxy-salicylic acid, methyl ester;
4-propoxy-salicylic acid, ethyl ester;
4-propoxy-salicylic acid, propyl ester;
4-propoxy-salicylic acid, butyl ester;
4-butoxy-salicylic acid;
4-butoxy-salicylic acid, sodium salt;
4-butoxy-salicylic acid, potassium salt;
4-butoxy-salicylic acid, methyl ester;
4-butoxy-salicylic acid, ethyl ester;
4-butoxy-salicylic acid, propyl ester;
4-butoxy-salicylic acid, butyl ester;
2-ethyl-4-hydroxy-benzoic acid;
2-ethyl-4-hydroxy-benzoic acid, butyl ester;
2-propyl-4-hydroxy-benzoic acid, potassium salt;
2-butyl-4-hydroxy-benzoic acid, butyl ester;
4-butyl salicylic acid, ethyl ester;
4-ethyl salicylic acid, sodium salt, etc.

The preferred oxygen barrier stabilizing compounds for use in the present invention are p-hydroxybenzoic acid, methyl ester; p-hydroxy-benzoic acid, ethyl ester; p-hydroxy-benzoic acid, propyl ester; p-hydroxy-benzoic acid, butyl ester; p-hydroxy-benzoic acid, octyl ester; salicylic acid, methyl ester; salicylic acid, butyl ester; salicylic acid, potassium salt; 2,4-dihydroxy-benzoic acid, methyl ester; 2,4-dihydroxy-benzoic acid, ethyl ester, 2,4-dihydroxy-benzoic acid, propyl ester; 2,4-dihydroxy-benzoic acid, potassium salt; 2-ethoxy-4-hydroxy-benzoic acid; 2-ethoxy-4-hydroxy-benzoic acid, methyl ester; and 2-ethoxy-4-hydroxy-benzoic acid, propyl ester.

Many applications require the polyvinyl alcohol resin to be plasticized in order to provide greater flexibility in the packaging material and to provide a wider range of application end uses for the polyvinyl alcohol packaging material. Examples of suitable plasticizers which may be used in the present invention include the following:

Tetrahydrofurfuryl alcohol; tributyl phosphate; tributyl oxyethyl phosphate; dimethyl formamide; ethanol formamide; ethanol acetamide; acetamide; trimethyol propane; combinations of glycerine and alkyl resins derived from the reaction between diethylene glycol and adipic acid; triacetin, polyglycerol; dibutyl phthalate; diphenyl phthalate; alkylated aryl polyether alcohols; sucrose, glycerol and glycerol esters; diglycerol; sorbitol; polyglycols containing from 4 to 20 carbon atoms in the molecule such as 2,3-butylene glycol; 1,3-butylene glycol; 1,4-butylene glycol; 2,2-dimethyl-1,3-butene diol; diethylene glycol; triethylene glycol; tetraethylene glycol; pentaethylene glycol; hexaethylene glycol; heptaethylene glycol; octaethylene glycol; nonethylene glycol; decaethylene glycol; and the mono- and dimethyl, ethyl, propyl and butyl ethers thereof; monophenylethers of polyoxyethylene containing of from 2 to about 7 ethylene oxide units per molecule; ethylene oxide derivatives of furfuralcohol containing from 3 to 12 moles of ethylene oxide per molecule, ethoxylated derivatives of urea; ethoxylated derivatives of tetrahydrofurfuryl alcohol; cyclic amides such as 2-oxazolidinone and 2-imidazolidinone and their ring substituted lower alkyl derivatives such as 5-methyl-2-oxazolidinone and their N-hydroxyalkyl derivatives such as 3-(2-hydroxyethyl)-5-methyl-2-oxazolidinone, etc.

The preferred plasticizers for use in the polyvinyl alcohol packaging materials of the present invention are the polyhydroxy compounds of a humectant nature such as glycerine, sorbitol, sucrose, 2,3-butylene glycol, 1,3-butylene glycol, 1,4-butylene glycol, 2,2-dimethyl-1,3-butene diol, diethylene glycol, triethylene glycol, tetraethylene glycol, pentaethylene glycol, hexaethylene glycol, heptaethylene glycol, octaethylene glycol, nonaethylene glycol, decaethylene glycol, and the mono- and dimethyl, ethyl, propyl and butyl ethers thereof.

The especially preferred plasticizer to be used in polyvinyl alcohol packaging materials is glycerine.

The resin is formulated according to conventional techniques and formed into films and containers according to those methods generally well known in the art. These methods include solution casting, blow extrusion, extrusion casting, etc., of films and blow molding, injection molding, etc. of containers such as bottles, capsules, boxes, etc.

DESCRIPTION OF THE PREFERRED EMBODIMENTS

The following examples are set forth to illustrate the present invention, and should not be construed as a limitation thereof. Unless otherwise indicated, all parts and percentages given are by weight.

The polyvinyl alcohol resin used in the following Examples 1 to 3 is a fully hydrolyzed material having less than 1.5% residual ester groups calculated as vinyl acetate and having an aqueous solution viscosity of about 13 centipoises, measured as a 4% aqueous solution at 20° C. The polyvinyl alcohol resin is plasticized with 15 parts of glycerine per 100 parts of resin (PHR).

Oxygen permeability testing is carried out on films having a thickness of from 0.5 to 4 mils. The film samples are aged in air for varying times at 23.5° C. and 100% relative humidity. Film samples are tested for oxygen permeability in a Dow Cell according to ASTM procedure D-1434-63. The oxygen permeability is reported in cc./mil/100 sq. in./24 hrs./cm. Hg.

EXAMPLES 1 TO 3 (Control)

Examples 1 to 3 are set forth as a control to illustrate the increase in oxygen permeability which occurs in polyvinyl alcohol films after prolonged exposure to high humidities when the films do not contain the oxygen barrier stabilizer compounds of the present invention. These conditions of high humidity are commonly encountered in the packaging field as for example in refrigerated food products and medicines.

The film samples are prepared by adding glycerine to a 15% aqueous polyvinyl alcohol solution so as to obtain a plasticizer level of 15 parts per hundred parts of resin. The plasticized solution is cast on polished steel plates and dried in a circulating air oven for 2 hours at 80° C. The dried films are stripped from the plates and conditioned at 23.5° C. and 100% R.H. prior to testing for oxygen permeability. The test results are tabulated below in the following Table I.

TABLE I.—OXYGEN PERMEABILITY OF CONTROL EXAMPLES 1 TO 3

| Example | Sample conditioning, days in air at 100% R.H. | Oxygen permeability,[1] cc./mil/100 sq.in./24 hrs./cm. Hg |
|---|---|---|
| 1 | 7 | 2.21 |
| 2 | 11 | 2.65 |
| 3 | 23 | 4.4 |

[1] Average of five (5) replicates.

EXAMPLES 4 TO 8

In the following examples the general procedures outlined for Examples 1 to 3 above are followed except that from 0.2 to 0.5 part, per hundred parts of resin, of an oxygen barrier stabilizing compound is dispersed in the polyvinyl alcohol solution along with the glycerine prior to the preparation of the film samples which are used for oxygen permeability testing. Films are then cast and tested according to the procedure outlined above. The aging conditions and oxygen permeability test results are tabulated in the following Table II:

TABLE II.—OXYGEN PERMEABILITY OF SAMPLES CONTAINING AN OXYGEN BARRIER STABILIZING COMPOUND

| Example | Stabilizer compound [1] | | | Amount of stabilizer (phr) | Conditioning [2] | Permeability [3] |
|---|---|---|---|---|---|---|
| | R | $R_1$ | $R_2$ | | | |
| 4 | $CH_3$ | H | OH | 0.5 | 18 | 0.10 |
| 5 | $CH_3$ | H | OH | 0.2 | 37 | 0.56 |
| 6 | $C_2H_5$ | H | OH | 0.5 | 20 | 0.08 |
| 7 | $C_8H_{17}$ | H | OH | 0.3 | 37 | 0.45 |
| 8 | $C_3H_7$ | H | OH | 0.2 | 18 | 0.19 |

[1] Value of R, $R_1$ and $R_2$ given in regard to the following generic structural formula

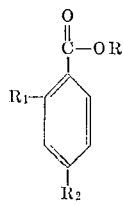

[2] Days in air at 23.5° C. and 100% R.H.
[3] Oxygen permeability cc./mil/100 sq. in./24 hrs./cm. Hg; average of five replicates.

A comparison of the permeability test data for Examples 4 to 8 with that data for the control Examples 1 to 3 will clearly indicate the superior oxygen permeability that is obtained when using the polyvinyl alcohol oxygen barrier stabilizing compounds of the present invention.

Examples 5 and 8 illustrate the significant improvement in oxygen barrier properties that is obtained when using as little as 0.2 part, per hundred parts of resin of an oxygen barrier stabilizing compound.

Examples 5 and 7 illustrate that the improved oxygen barrier properties of the polyvinyl alcohol are maintained even after thirty seven (37) days exposure to conditions of 100% R.H.

EXAMPLE 9

This example is set forth to illustrate the use of a mixture of oxygen barrier stabilizing compounds in polyvinyl alcohol films prepared by blow extrusion methods. 100 parts of polyvinyl alcohol of the type used in the foregoing examples is dry blended in a high intensity mixer with:

| | Parts |
|---|---|
| Para-hydroxy benzoic acid, methyl ester | 0.2 |
| Para-hydroxy benzoic acid, propyl ester | 0.3 |
| Glycerine | 15.0 |
| A butylated hydroxytoluene antioxidant | 0.2 |

The material is then pelletized and blow extruded into a film having a thickness of about 0.7 mil according to the process described in British Pat. 1,040,506. This film is then aged for 20 days at 23.5° C. and 100% R.H. and then tested for oxygen permeability according to the procedures described above. The film samples are found to have an average oxygen permeability of 0.25 cc./mil/100 sq. in./24 hrs./cm. Hg. This value is far superior to those obtained in control Examples 1 to 3.

The following Examples, 10 to 11 are set forth to illustrate the use of a different polyvinyl alcohol in combination with the oxygen barrier stabilizing compounds of the present invention.

EXAMPLE 10

Example 4 is repeated here except using a polyvinyl alcohol resin having a residual acetate content of 3% and an aqueous solution viscosity of 16 cps. The films which were prepared, aged and tested according to the general procedure of Example 4 were found to have an average oxygen permeability of 0.14 cc./mil/100 sq. in./24 hrs./cm. Hg.

EXAMPLE 11

Example 10 is repeated here except using a polyvinyl alcohol resin having an aqueous solution viscosity of 43 cps. Comparable oxygen barrier results are obtained.

EXAMPLE 12

In this example a dry blended resin/stabilizer composition of the type used in Example 9 is used to prepare four ounce (4 oz.) Boston Round bottles. The bottles are prepared using a blow molder and a stock temperature of 450–500° F. to give bottles with an average wall thickness of 15 mils. These bottles are found to have oxygen permeability comparable to that obtained in the film samples of Example 9.

The following Examples, 13 to 20, are set forth to further illustrate other oxygen barrier stabilizing compounds which may be used within the scope of the present invention to stabilize the oxygen barrier properties of polyvinyl alcohol film. In each example the general procedures set forth in Example 4 above are followed in regard to film preparation, sample aging and oxygen permeability testing.

Test results indicate that the oxygen permeability of the film samples is equivalent to that obtained with the samples tested in Example 4. The oxygen barrier stabilizing compounds used in the respective examples are tabulated below in the following Table III.

TABLE III.—SUMMARY OF OXYGEN BARRIER STABILIZING COMPOUNDS USED IN EXAMPLES 13 TO 20

| Example | Stabilizer compound [1] value of— | | | Concentration of oxygen barrier stabilizer compound [2] |
|---|---|---|---|---|
| | R | $R_1$ | $R_2$ | |
| 13 | K | OH | OH | 0.05 |
| 14 | Methyl | OH | OH | 0.2 |
| 15 | H | $OC_2H_5$ | OH | 0.09 |
| 16 | Na | H | OH | 3.0 |
| 17 | H | $CH_3$ | OH | 3.1 |
| 18 | $CH_3$ | OH | H | 0.2 |
| 19 | $CH_3$ | OH | $C_2H_5$ | 0.9 |
| 20 | H | OH | $C_4H_9$ | 1.7 |

[1] Value of R, $R_1$ and $R_2$ given in regard to the following generic structural formula

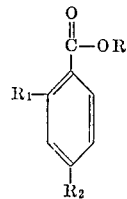

[2] Parts per hundred parts of resin.

As stated above, the polyvinyl alcohol packaging films containing the oxygen barrier stabilizing compounds of the present invention may be prepared by extrusion, pressing, calendering, casting and by other methods as are well known to those skilled in the art. Bottles and containers may be made by any of the conventional methods such as blow extrusion, injection molding, vacuum forming, casting, etc. The oxygen barrier stabilized polyvinyl alcohol resins of this invention are especially useful in flush and vacuum packaging operations, as they provide good barriers to flush gases such as nitrogen.

The films prepared according to the present invention may be used by themselves or as a member of a laminate as in thermoplastic resin/polyvinyl alcohol or thermoplastic resin/polyvinyl alcohol/thermoplastic resin laminates.

Furthermore, the films may be coated with those various coatings used in the packaging industry which are well known to those skilled in the art.

In addition to the foregoing, the oxygen barrier stabilized polyvinyl alcohol resins of this invention may be applied as a barrier coating onto paper, corrugated board, laminated paper products, polymer films, and other related materials that are used in the packaging industry. These barrier coatings may be applied to these various substrates by any of the known methods, e.g., melt extrusion coating, solvent coating, etc.

This invention also contemplates the use of conventional additives such as dyes, fillers, pigments, plasticizers, resin stabilizers, etc., in the oxygen barrier stabilized resins of the present invention.

It is obvious that many deviations may be made in the products and processes set forth above without departing from the scope of this invention.

What is claimed is:
1. A poly(vinyl alcohol) composition which comprises a matrix of poly(vinyl alcohol) resin having uniformly dispersed therein at least 0.03 parts, per hundred parts of resin, of an oxygen barrier stabilizing compound which corresponds to the following general formula:

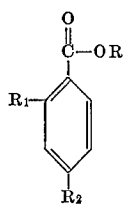

wherein R is selected from the group consisting of hydrogen, alkyl radicals of from 1 to 8 carbon atoms and alkali metals; and wherein $R_1$ and $R_2$ are selected from the group consisting of hydrogen, hydroxyl, alkyl radicals of from 1 to 5 carbon atoms and alkoxy radicals of from 1 to 5 carbon atoms provided that at least one of the $R_1$ or $R_2$ substituents is alkoxy or hydroxyl.

2. The composition of claim 1 wherein the poly(vinyl alcohol) contains from 0 to less than 5% residual ester groups calculated as poly(vinyl acetate) and has an aqueous solution viscosity of from 4 to 76 centipoises when measured as a 4% solution at 20° C.

3. The composition of claim 1 wherein the oxygen barrier stabilizing compound is p-hydroxy-benzoic acid, methyl ester.

4. The composition of claim 1 wherein the oxygen barrier stabilizing compound is p-hydroxy-benzoate acid, ethyl ester.

5. The composition of claim 1 wherein the oxygen barrier stabilizing compound is salicylic acid, potassium salt.

6. The composition of claim 1 wherein the oxygen barrier stabilizing compound is p-hydroxy-benzoic acid, propyl ester.

7. A poly(vinyl alcohol) composition suitable for packaging food, medicines and other related objects which composition is characterized by having an oxygen permeability of less than 1.0 cc./mil/100 sq. in./24 hrs./cm. Hg after 14 days exposure to conditions of 100% relative humidity at 23.5° C., which composition comprises a matrix of poly(vinyl alcohol) resin having uniformly dispersed therein at least 0.03 part, per hundred parts of resin, of an oxygen barrier stabilizing compound which corresponds to the following general formula:

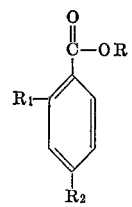

wherein R is selected from the group consisting of hydrogen, alkyl radicals of from 1 to 8 carbon atoms and alkali metals; and wherein $R_1$ and $R_2$ are selected from the group consisting of hydrogen, hydroxyl, alkyl radicals of from 1 to 5 carbon atoms and alkoxy radicals of from 1 to 5 carbon atoms provided that at least one of the $R_1$ or $R_2$ substituents is alkoxy or hydroxyl.

8. The composition of claim 7 wherein the poly(vinyl alcohol) contains from 0 to less than 5% residual ester groups calculated as poly(vinyl acetate) and has an aqueous solution viscosity of from 4 to 76 centipoise when measured as a 4% solution at 20° C.

9. The composition of claim 8 wherein the alcohol rier stabilizing compound is an alkyl ester of p-hydroxy-benzoic acid wherein the alkyl group contains from 1 to 8 carbons atoms.

10. The composition of claim 8 wherein the alcohol moiety of the alkyl ester of the p-hydroxy-benzoic acid contains from 1 to 3 carbon atoms.

11. A plasticized poly(vinyl alcohol) composition suitable for packaging food, medicines and other related objects which composition is characterized by having an oxygen permeability of less than 1.0 cc./mil/100 sq.in./24 hrs./cm. Hg after 14 days exposure to conditions of 100% relative humidity at 23.5° C.; which composition comprises a matrix of poly(vinyl alcohol) resin having uniformly dispersed therein from 0.1 to 3.0 parts, per hundred parts of resin, of an oxygen barrier stabilizing compound which corresponds to the following general formula:

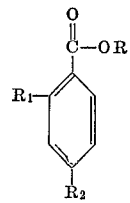

wherein R is selected from the group consisting of hydrogen, alkyl radicals of from 1 to 8 carbon atoms and alkali metals; and wherein $R_1$ and $R_2$ are selected from the group consisting of hydrogen, hydroxyl, alkyl radicals of from 1 to 5 carbon atoms and alkoxy radicals of from 1 to 5 carbon atoms provided that at least one of the $R_1$ or $R_2$ substituents is alkoxyl or hydroxyl; wherein the poly(vinyl alcohol) contains from 0 to less than 3% residual ester groups calculated as poly(vinyl acetate) and has an aqueous solution viscosity of from 4 to 76 centipoise when measured as a 4% solution at 20° C.; and wherein the plasticizer is a polyhydroxy humectant type plasticizer.

12. The composition of claim 11 wherein the poly(vinyl alcohol) contains from 0 to 2% residual ester groups calculated as poly(vinyl acetate).

13. The composition of claim 11 wherein the oxygen barrier stabilizing compound is p-hydroxy-benzoic acid, methyl ester.

14. The composition of Claim 11 wherein the oxygen barrier stabilizing compound is p-hydroxy-benzoate acid, ethyl ester.

15. The composition of claim 11 wherein the oxygen barrier stabilizing compound is salicylic acid, potassium salt.

References Cited

UNITED STATES PATENTS 3,262,905   7/1966   Martins _____ 260—45.7

OTHER REFERENCES

Modern Plastics Encyclopedia for 1964, Hildreth Press Inc., Briston, Conn., vol. 41, No. 1A, p. 504 "Polyvinyl Alcohol Film" article.

DONALD E. CZAJA, Primary Examiner

V. P. HOKE, Assistant Examiner

U.S. Cl. X.R.

99—171, 176, 181; 117—71, 72; 260—30.2, 30.6, 31.6, 31.8, 32.4, 32.6, 33.2, 45.85; 424—32

PO-1050
(5/69)

UNITED STATES PATENT OFFICE
CERTIFICATE OF CORRECTION

Patent No. 3,516,960      Dated June 23, 1970

Inventor(s) Joseph G. Martins and Norman I. Mowry

It is certified that error appears in the above-identified patent and that said Letters Patent are hereby corrected as shown below:

Claim 9, line 1, "claim 8 wherein the alcohol rier" should read --- claim 7 wherein the oxygen barrier ---.

SIGNED AND
SEALED
OCT 20 1970

(SEAL)
Attest:

Edward M. Fletcher, Jr.
Attesting Officer

WILLIAM E. SCHUYLER, JR.
Commissioner of Patents